Jan. 3, 1961  W. G. KONOLD ET AL  2,966,877
HIGHWAY SIGNAL DEVICE
Filed March 29, 1957
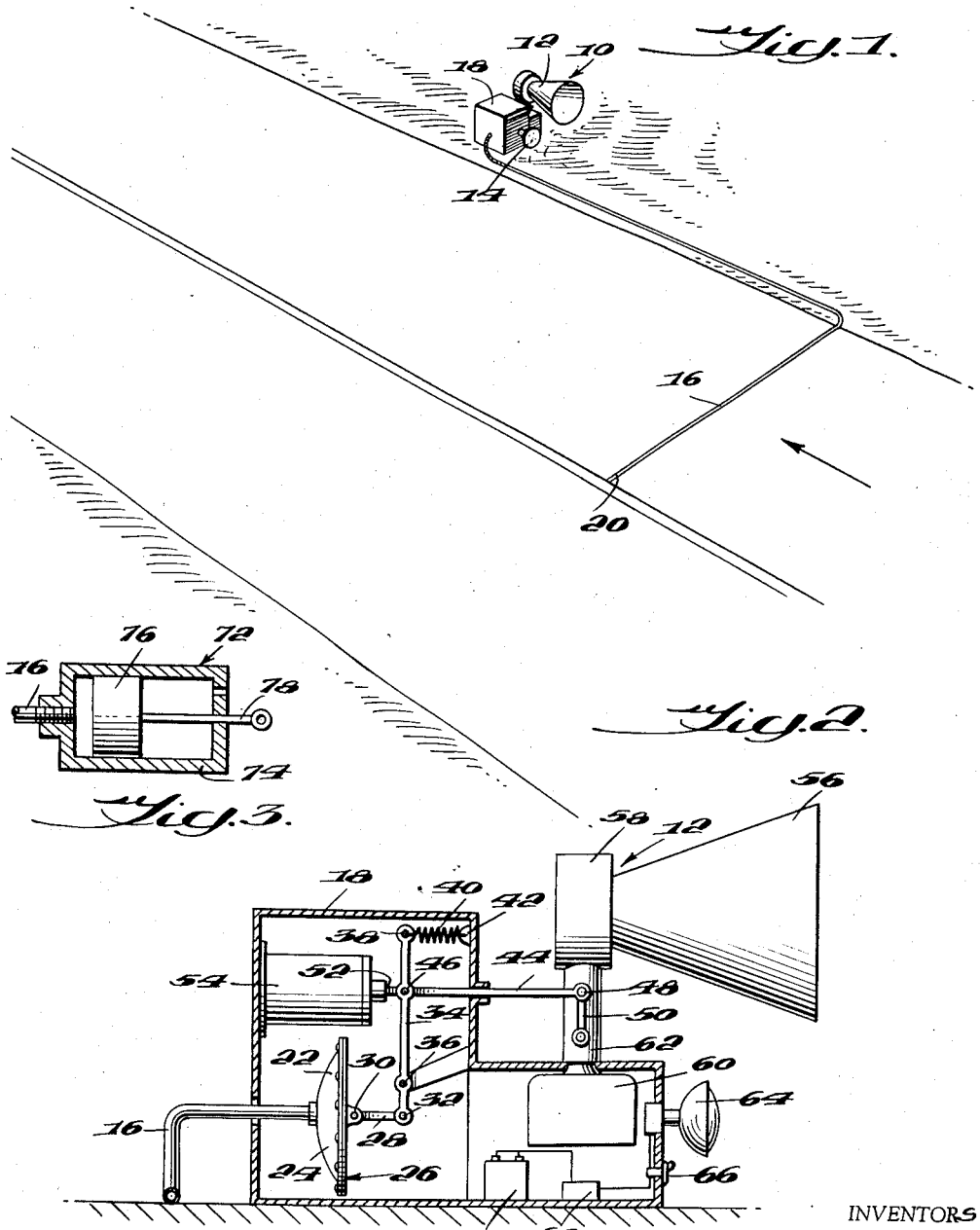
INVENTORS
WILLIAM G. KONOLD,
JOHN A. FINKEN,
BY William G. Konold
ATTORNEY

# United States Patent Office 2,966,877
Patented Jan. 3, 1961

2,966,877

HIGHWAY SIGNAL DEVICE

William G. Konold and John A. Finken, Falls Church, Va., assignors to George Mingle, Columbus, Ohio Filed Mar. 29, 1957, Ser. No. 649,392

3 Claims. (Cl. 116—65)

This invention relates to a highway signal device, and more particularly to a portable device adapted to be set out on the edge of the highway to warn approaching motorists of a dangerous accident or the like ahead.

This invention is an improvement over the invention of Patent Number 2,671,212 issued to George Mingle, the assignee of this invention. This invention consisted of a portable unit provided with warning light signal, an audible signal and means for the intermittent operation of said signals.

While the invention of the earlier Mingle patent was completely satisfactory insofar as operating characteristics are concerned, it created a problem of undesirable drain on the power supply. This was true whether the power supply was self-contained in the portable unit, or whether the unit was connected to the power supply of the highway patrol car or the like. The principal drain on the power supply came from the audible signal, whether it be a horn or a siren.

In order to solve the problem, it was deemed advisable to maintain the unit inoperative except for the flashing lights until a vehicle approached the device. A suitable tripping mechanism could be provided which would initiate the operation of the horn or siren and a time delay mechanism would maintain the horn or siren operative for a few seconds, which would be sufficient time to alert the approaching motorist. Even with the arrangement described, the battery drain on a heavily traveled highway would be considerable.

It is an object of the invention to reduce the high power demand disadvantages referred to above by using a horn energized from a supply of gas under pressure. The horn is of the type manufactured by the Falcon Alarm Company of Summit, New Jersey, and, generally comprises a supply of gas under pressure, a diaphragm, a valve for selectively permitting gas to pass over the diaphragm, vibrating the diaphragm to generate the audible signal and a resonant bell arrangement connected to the vibrating diaphragm. See Patents Nos. 2,777,416 and 2,778,330 for examples of the general type of horn referred to.

Associated with such a horn is a system of flashing of lights which further identify for the motorist the fact that there is a trouble spot ahead on the highway.

It is another object of the invention to provide a vehicle sensing device combined with a gas operated horn whose operation is initiated by the vehicle sensing device.

It is another object of the invention to provide such a horn and sensing device combined further with a time delay mechanism which will maintain the horn in operation for a predetermined interval each time an approaching vehicle causes the operation of the sensing device.

It is another object of the invention to provide a system of flashing warning lights combined with a gas operated horn providing at least a 100 decibel blast to jar a road hypnotized driver into realization of approaching danger which is further identified by the flashing lights.

It is still another object of the invention to provide a portable warning device comprising a flexible tube having an expansible chamber associated with one end, which expansible chamber will move when the tube is compressed, thereby driving a linkage to operate the gas operated horn. Preferably the tube and expansible chamber are loaded with a substantially incompressible fluid to provide a positive operation.

These and other objects of the invention will become more readily apparent from the following detailed description of the invention taken in conjunction with the accompanying drawings in which:

Fig. 1 is a perspective view of a highway showing the use of the invention;

Fig. 2 is a diagrammatic illustration of the operating mechanism for the invention shown partly in elevation and partly in section; and Fig. 3 is a fragmentary view of an alternative expansible chamber means for use with the invention.

The portable signal device is indicated generally at 10 and consists of a horn 12, a flashing light 14, and a sensing device 16 lying across the road. A housing 18 contains the operating mechanism for the flashing light and the horn.

Referring to Fig. 2, the operating mechanism is shown diagrammatically. The sensing device consists of a flexible tube or hose closed at one end 20 (Fig. 1) and connected at the other end to an expansible chamber arrangement 22. The expansible chamber device in this embodiment consists of a rigid housing 24 and a flexible diaphragm 26 mounted in fluid-tight relationship around its periphery to the rigid member 24.

A link 28 is pivotally mounted at 30 to the flexible diaphragm 26 and at the other end of the link 32 is mounted to a lever 34 pivotally mounted about a fulcrum point 36. The other end of lever 34 is connected at 38 to a tension spring 40 connected at 42 to the housing 18.

A link 44 pivotally connected at 46 to lever 34 intermediate fulcrum 36 and upper end 38 is pivotally connected at one end 48 to valve lever 50 on horn 12 and at the other end 52 to a dash pot 54 which serves as a time delay means to maintain operation of the horn for a predetermined interval.

The horn 12 consists of a resonating bell 56 associated with the vibrating diaphragm (not shown) contained in a housing 58. The vibrating diaphragm is connected to a container 60 of gas under pressure. Types of gas used in this application are Freon and $CO_2$. The gas supply 60 communicates with the diaphragm through a passage 62 which can be selectively opened and closed by operating valve lever 50.

Also mounted to the housing is a lamp 64 connected through a switch 66 and bi-metal flasher attachment 68 to a source of power such as a D.C. storage battery 70. When the switch is turned on, the flasher attachment 68 will cause the lamp 64 to blink intermittently. Alternatively, a rotating lamp such as is currently used on emergency vehicles could be substituted for the lamp 64 and flasher attachment 68.

Instead of using the flexible diaphragm expansible chamber 22, an alternative expansible chamber 72, shown in Fig. 3, can be substituted. The chamber 72 consists of a cylinder 74 to which sensing tube 16 is attached. A piston 76 having a connecting rod 78 is slideably mounted in the cylinder 74.

As indicated, in the preferred embodiment of the invention, an incompressible fluid such as brake fluid would be used to drive the expansible chamber device. In such embodiment, the flexible diaphragm device 22 is most suitable since it can be maintained absolutely fluid-tight.

On the other hand, if the tube 16 is loaded with air, the piston and cylinder expansible chamber device in Fig. 3 might be found to be the most suitable in that greater linear movement of the operating linkage can be obtained through the use of the piston and cylinder.

In operation, the device is placed along side the road 100 yards or so in advance of the approaching traffic. The flexible tube is laid across the road, preferably at least 25 feet away from the horn toward the approaching traffic. By such a disposition of the flexible tube, the horn will emit its signal ahead of the approaching motorist rather than at the instant the car passes the device.

As the motorist approaches the trouble spot, perhaps in a semi-hypnotic state induced by many hours of driving, he may or may not take notice of the flashing of the lamp 14. However, as his wheels run over the tube 16, the fluid acting through the expansible chamber device actuates the valve in the horn 12 causing a loud audible blast. The sharp blast jars the driver into a state of alertness and he immediately makes the association of the flashing light with the horn as indicating trouble ahead.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

We claim:

1. A portable highway warning signal comprising a horn, a supply of gas under pressure connected to said horn for causing said horn to emit an audible signal, a valve controlling the supply of gas to said horn, a flexible fluid-filled tube adapted to be located on a highway, one end of said tube being closed, the other end of said tube being connected to a closed housing having a flexible diaphragm forming one wall thereof, and means connecting said diaphragm to said valve, said connecting means comprising linkage from said diaphragm to said valve, and a dash pot time delay connected to said linkage to delay the closing of said valve for a predetermined interval.

2. A portable highway warning signal comprising a horn, a supply of compressed gas under pressure connected to said horn for causing said horn to emit an audible signal, a valve controlling the supply of gas to said horn, a flexible fluid filled tube adapted to be located on a highway, one end of said tube being closed, the other end of said tube being connected to expansible chamber means having a movable member, means connecting said movable member to said valve to open said valve when a vehicle passes over said tube, said connecting means comprising linkage from said movable member to said valve, and time delay means connected to said valve to delay the closing of said valve for a predetermined interval.

3. A portable highway warning signal comprising, a gas powered horn, a supply of gas under pressure connected to said horn and causing said horn to emit an audible signal, a valve controlling the supply of gas to said horn, an elongated flexible hose adapted to be positioned across a highway so as to be compressible by a passing vehicle, air pressure sensitive means connected to one end of said hose, means connecting said air pressure sensitive means to said valve, said air pressure sensitive means opening said valve when said hose is compressed to operate said horn, and time delay means connected to said valve and maintaining said horn in operation for a predetermined interval.

References Cited in the file of this patent

UNITED STATES PATENTS

| | | |
|---|---|---|
| 175,486 | Morris | Mar. 28, 1876 |
| 1,220,762 | Lyman | Mar. 27, 1917 |
| 2,074,443 | Walpole | Mar. 23, 1937 |
| 2,583,835 | Grossenbach | Jan. 29, 1952 |
| 2,772,574 | Thomas | Dec. 4, 1956 |
| 2,778,330 | Jacoby | Jan. 22, 1957 |
| 2,793,651 | Gomez | May 28, 1957 |
| 2,839,264 | Trubert | June 17, 1958 |

FOREIGN PATENTS

| | | |
|---|---|---|
| 278,058 | Great Britain | Sept. 21, 1927 |